(12) United States Patent
Yang et al.

(10) Patent No.: US 10,382,894 B2
(45) Date of Patent: Aug. 13, 2019

(54) METHOD OF MEASURING INTER-DEVICE RELATIVE COORDINATES AND DEVICE USING THE SAME

(71) Applicant: ELECTRONICS AND TELECOMMUNICATIONS RESEARCH INSTITUTE, Daejeon (KR)

(72) Inventors: Hoe Sung Yang, Daejeon (KR); Seung Il Myong, Daejeon (KR); Kang Bok Lee, Daejeon (KR); Jun Ho Jin, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/033,404

(22) Filed: Jul. 12, 2018

(65) Prior Publication Data

US 2019/0037348 A1    Jan. 31, 2019

(30) Foreign Application Priority Data

Jul. 28, 2017  (KR) .................. 10-2017-0096463
Apr. 23, 2018  (KR) .................. 10-2018-0046481

(51) Int. Cl.
*H04W 4/02* (2018.01)
*H04W 72/04* (2009.01)
(Continued)

(52) U.S. Cl.
CPC ............ *H04W 4/023* (2013.01); *G01C 21/12* (2013.01); *G01C 21/16* (2013.01); *G01S 5/10* (2013.01);
(Continued)

(58) Field of Classification Search
CPC ..... H04W 4/22; H04W 76/007; H04W 64/00; H04W 4/02; H04W 80/00; H04W 84/12;
(Continued)

(56) References Cited

U.S. PATENT DOCUMENTS 7,515,606 B2    4/2009  Kim et al.
8,457,180 B2    6/2013  Lakkis et al.
(Continued)

FOREIGN PATENT DOCUMENTS

KR          10-0532589 B1    12/2005
KR    10-2015-0011870 A      2/2015
(Continued)

*Primary Examiner* — Fred A Casca
(74) *Attorney, Agent, or Firm* — LRK Patent Law Firm

(57) ABSTRACT

A method of measuring inter-device relative coordinates performed by a first device communicating with at least one second device belonging to a group to which the first device belongs includes measuring a range between the first device and the second device through communication with the second device; receiving range information between a plurality of second devices from the second device; calculating a plurality of solutions for inter-device relative coordinates using information about the range between the first device and the second device and the range information between the plurality of second devices; and deducing a true solution among the plurality of solutions for the inter-device relative coordinates using coordinates of each of the first device and the at least one second device with respect to a reference origin that is calculated using a Pedestrian Dead Reckoning (PDR) technique.

20 Claims, 13 Drawing Sheets

(51) Int. Cl.
  *G01S 5/10* (2006.01)
  *G01C 21/12* (2006.01)
  *G01C 21/16* (2006.01)
  *G05D 1/02* (2006.01)

(52) U.S. Cl.
  CPC ............ *G05D 1/02* (2013.01); *H04W 72/048* (2013.01); *H04W 72/0446* (2013.01)

(58) Field of Classification Search
  CPC ... H04W 4/025; H04W 4/028; H04W 64/003; H04M 2242/04; H04M 11/04; H04M 2242/30; H04M 3/42348; H04M 3/42357
  USPC .... 455/404.2, 404.1, 456.1, 414.1, 433, 521
  See application file for complete search history.

(56) References Cited

U.S. PATENT DOCUMENTS

| | | | | |
|---|---|---|---|---|
| 2005/0141553 | A1* | 6/2005 | Kim | H04B 1/7163 370/466 |
| 2011/0098001 | A1* | 4/2011 | Elsom-cook | G01S 3/20 455/41.2 |
| 2013/0324150 | A1 | 12/2013 | Cho et al. | |
| 2018/0005450 | A1* | 1/2018 | Daniels | G06T 19/006 |

FOREIGN PATENT DOCUMENTS

| | | |
|---|---|---|
| KR | 10-2015-0118710 A | 10/2015 |
| KR | 10-2016-0143438 A | 12/2016 |
| KR | 10-1755944 B1 | 7/2017 |

* cited by examiner

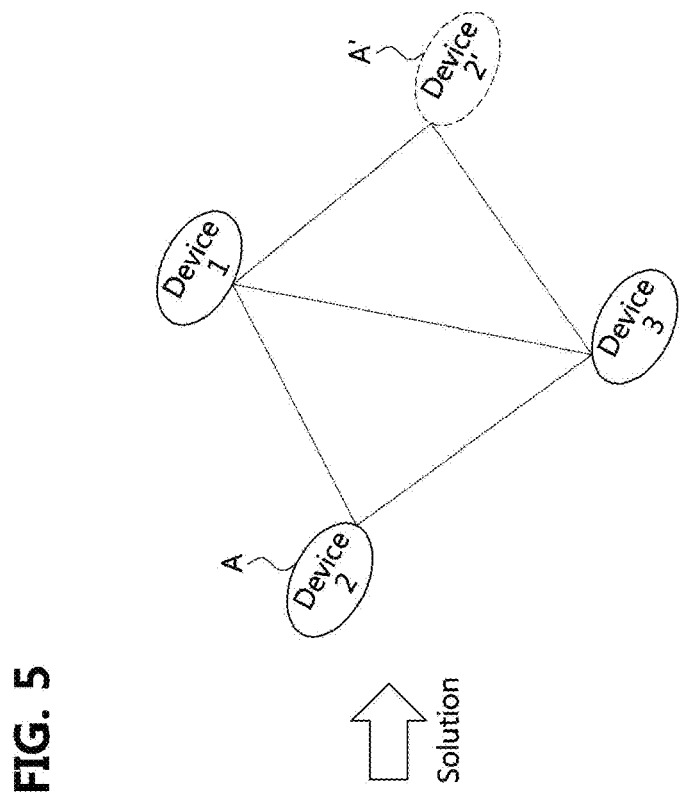
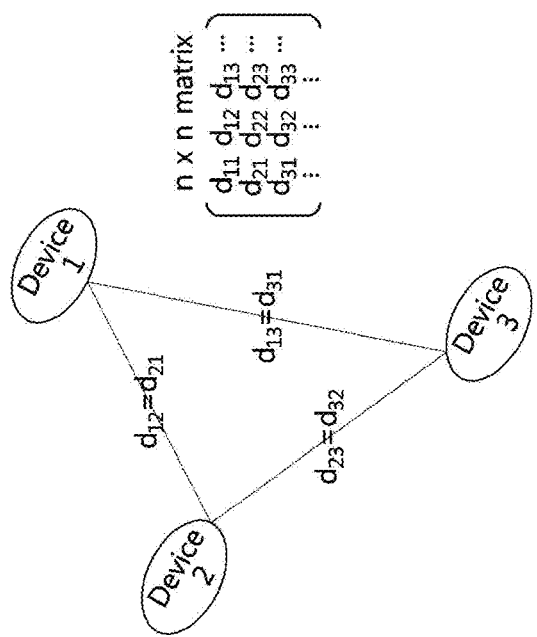
FIG. 5

METHOD OF MEASURING INTER-DEVICE RELATIVE COORDINATES AND DEVICE USING THE SAME

CROSS-REFERENCE TO RELATED APPLICATIONS

This application claims priority to Korean Patent Application No. 10-2017-0096463, filed Jul. 28, 2017, and Korean Patent Application No. 10-2018-0046481 filed Apr. 23, 2018, in the Korean Intellectual Property Office (KIPO), the entire contents of which are hereby incorporated by reference.

BACKGROUND

1. Technical Field

Example embodiments of the present invention generally relate to a method of measuring inter-device relative coordinates and a device using the same, and more specifically, to a method of measuring inter-device relative coordinates on the basis of data collected for each object to allow mutual identification of the positions of objects (activity agents) sent in groups into an environment where no infrastructure for position tracking is constructed, such as a disastrous incident, a disaster site, and a special operation area, and a device using the same.

2. Description of Related Art

The conventional position tracking identifies the position of a user through a global positioning system (GPS) receiving terminal on the basis of GPS signals. However, due to a multipath phenomenon in urban areas, the accuracy of position information is lowered, and indoor position tracking is not possible. In addition, the position tracking is generally performed employing a fingerprint positioning method that utilizes communication infrastructure, such as the strength of light (or radio waves) and the position of an access point (AP), based on WiFi APs. However, the fingerprint method fundamentally requires infrastructure, such as APs, to be previously installed, and also requires periodic update of AP information subsequent to installing the infrastructure, and thus is difficult to use.

Another method, which has no need to utilize infrastructure, is a method of calculating a movement direction of a user by calculating acceleration and angular rate with respect to a user's movement and geomagnetic information in the vicinity using an inertial measurement unit (IMU). However, the method is subject to cumulative errors that increase over elapsed time due to the physical characteristics of the IMU.

SUMMARY

Accordingly, example embodiments of the present invention are provided to substantially obviate one or more problems due to limitations and disadvantages of the related art.

As is apparent from example embodiments of the invention, mutual positions of objects (activity agents) sent in groups into an environment where no infrastructure for position tracking is constructed, such as a disastrous incident, a disaster site, and a special operation area are identified and recognized so that efficient collaboration between the objects and safe activity can be ensured.

In addition, the present invention can aid in returning agents or team members, who are sent into a disaster site, to the origin.

In order to achieve the objective of the present disclosure, a method of measuring inter-device relative coordinates performed by a first device communicating with at least one second device belonging to a group to which the first device belongs may comprise measuring a range between the first device and the second device through communication with the second device; receiving range information between a plurality of second devices from the second device; calculating a plurality of solutions for inter-device relative coordinates using information about the range between the first device and the second device and the range information between the plurality of second devices; and deducing a true solution among the plurality of solutions for the inter-device relative coordinates using coordinates of each of the first device and the at least one second device with respect to a reference origin that is calculated using a Pedestrian Dead Reckoning (PDR) technique.

The first device and the second device may communicate with each other using an ultra-wide band (UWB) method.

The method may further comprise calculating coordinates of the first device with respect to the reference origin using an inertial measurement unit (IMU) included in the first device.

The method may further comprise correcting an error of the coordinates of the first device with respect to the reference origin by using the true solution.

The range between the first device and the second device is calculated using a total transaction between the first device and the second device, a speed of light or radio waves, a return delay of a device, and a time of flight of a signal.

The method may further comprise calculating coordinates of the first device with respect to the reference origin using the PDR technique; and transmitting information about the coordinates of the first device to the second device.

The method may further comprise receiving information about the coordinates of the second device with respect to the reference origin from the second device.

The first device and the second device may transmit and receive data therebetween using a frame structure including superframes and a guard slot positioned between the superframes.

The first device may transmit information about the first device using a slot allocated to the first device among a plurality of slots included in the superframe.

Each of a plurality of devices belonging to the same group may transmit information about inter-device range information to another device using the guard slot.

In order to achieve the objective of the present disclosure, a device for measuring relative coordinates between a plurality of devices belonging to the same group may comprise a communication module performing communication with other devices belonging to the same group; an IMU module configured to calculate coordinates of the device with respect to a reference origin according to a Pedestrian Dead Reckoning (PDR) technique; a processor; and a memory that stores at least one command executed through the processor, wherein the at least one command includes a command allowing a range between the device and another device to be measured through communication with the other device; a command allowing range information between the plurality of other devices to be received from the other device; a command allowing a plurality of solutions for inter-device relative coordinates to be calculated using range information between the plurality of devices belonging to the same group; and a command allowing a true solution among the plurality of solutions for the inter-device relative coordinates to be deduced using coordinates of each device with respect to the reference origin that is calculated using the PDR technique.

The communication module and the other device may communicate with each other using an ultra-wide band (UWB) method.

The reference origin may equally apply to all devices belonging to the same group.

The at least one command may further include a command allowing an error of the coordinates of the device with respect to the reference origin to be corrected using the true solution.

The range information between the plurality of devices belonging to the same group is calculated using a total transaction between devices, a speed of light or radio waves, a return time of a device, and a time of flight of a signal.

The at least one command includes a command allowing coordinates of the device with respect to the reference origin to be calculated using the PDR; and a command allowing information about the coordinates of the device to be transmitted to the other device.

The at least one command may further include a command allowing information about the coordinates of the other device with respect to the reference origin to be received from the other device.

The device and the other device may transmit and receive data therebetween using a frame structure including a plurality of superframes and a guard slot positioned between the superframes.

The device may transmit information about the device to the other device by using a slot, which is allocated to the device, among a plurality slots included in the superframe.

The device may broadcast range information between the device and the other device through the guard slot.

BRIEF DESCRIPTION OF DRAWINGS

Example embodiments of the present invention will become more apparent by describing example embodiments of the present invention in detail with reference to the accompanying drawings, in which:

FIG. 5 is a conceptual diagram illustrating an example in which ranges between objects measured through UWB communication are converted into a matrix and a relative-coordinate solution is obtained on the basis of the matrix;

FIGS. 10A and 10B are conceptual diagrams showing a method of sharing inter-device range information according to an embodiment of the present invention, in which FIG. 10A shows a concept of a centrally-controlled type range information sharing method, and FIG. 10B shows a concept of a distributed type range information sharing method;

DETAILED DESCRIPTION OF EXAMPLE EMBODIMENTS

Figure 1:
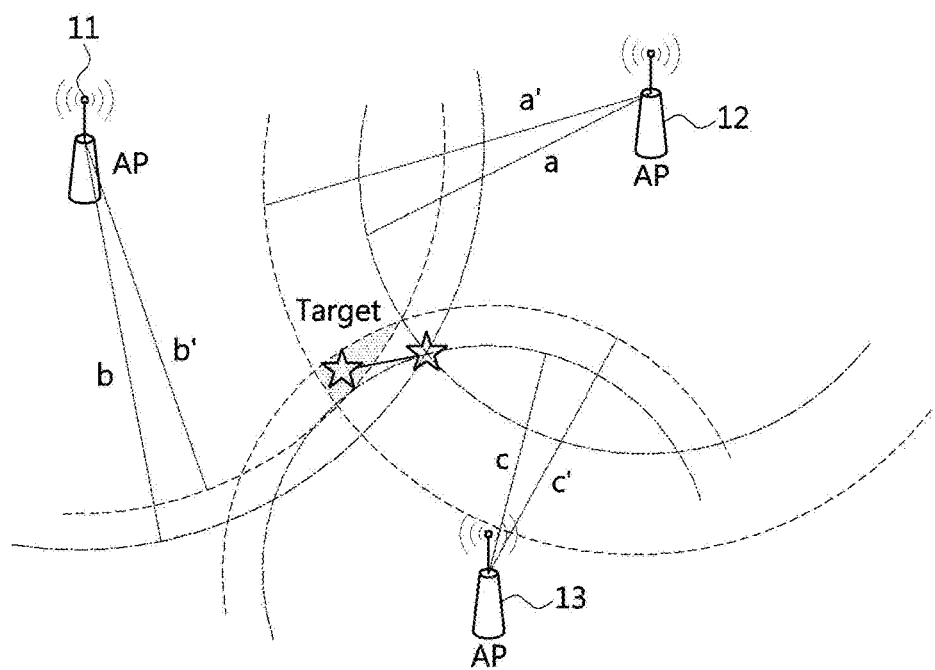
FIG. 1 is a schematic conceptual diagram illustrating a position tracking method using triangulation.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, exemplary embodiments of the present invention will be described in detail with reference to the accompanying drawings.

Hereinafter, example embodiments of the present invention will be described in detail with reference to the accompanying drawings.

FIG. 1 is a schematic conceptual diagram illustrating a position tracking method using triangulation.

Referring to FIG. 1, a triangulation method calculates the position of an object using three or more access points (APs) 11, 12, and 13. The three APs 11, 12, and 13 each measure the signal strength of a signal or the time of arrival of a signal with respect to an object to be tracked, convert the measured signal strength or time of arrival into a range, and solve a range equation with respect to the range calculated for each AP, thereby calculating the position of the object. The triangulation method calculates the position of an object to be tracked when position information of three or more APs has been previously identified.

Figure 2:
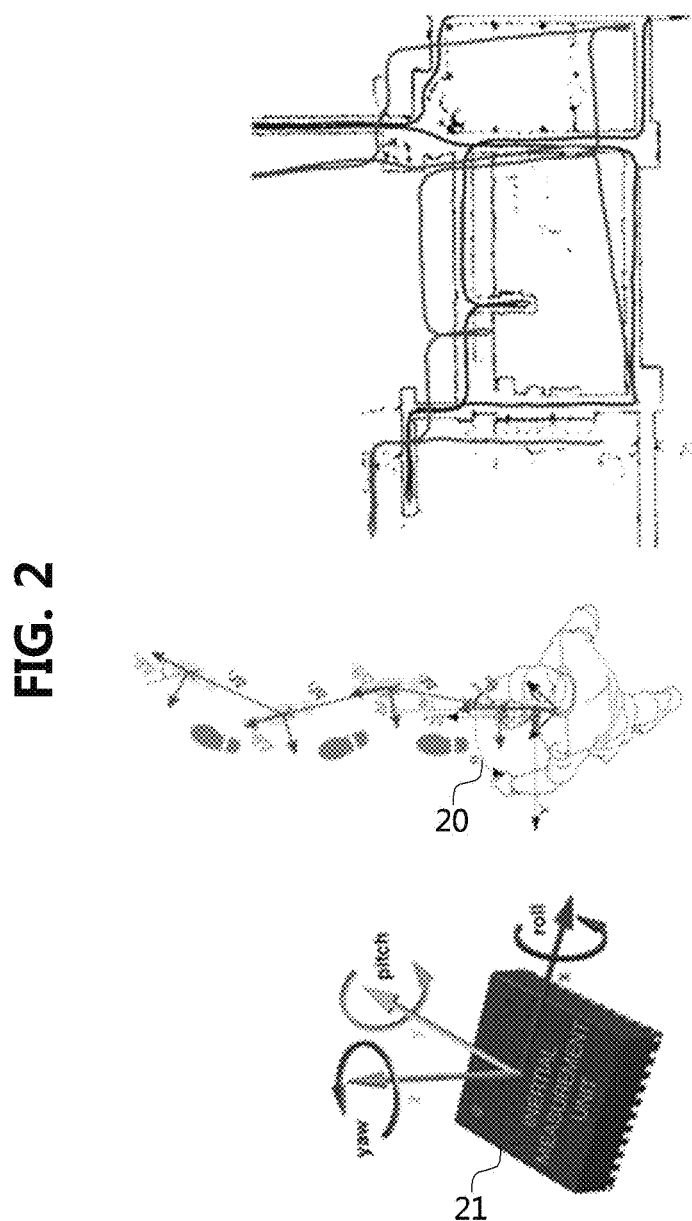
FIG. 2 is a schematic conceptual diagram illustrating a method of calculating a position using a Pedestrian Dead Reckoning (PDR) technique.

FIG. 2 is a schematic conceptual diagram illustrating a method of calculating a position using a Pedestrian Dead Reckoning (PDR) technique.

The PDR is a representative example of a relative positioning system. The relative positioning system is a system that tracks a variable quantity relative to an initial position and direction in tracking the position of an object, in contrast to an absolute positioning system that tracks an absolute position of an object, such as satellite navigation.

The PDR is a method of continuously adding an estimate of relative displacement of a pedestrian corresponding to the count of steps. Accordingly, the estimate of relative displacement includes not only errors occurring due to uneven stride length of the pedestrian but also errors involved in an estimate of a variable direction of travel. Accordingly, in the case of the PDR, the position estimate of a pedestrian becomes increasingly inaccurate over elapsed time. Such a characteristic is found in all the relative positioning systems.

Referring to FIG. 2, the PDR tracks a movement path using an inertial measurement unit (IMU). The IMU is a device that measures and reports a body's specific force, an angular rate, and sometimes the magnetic field surrounding the body by using accelerometers, gyroscopes, and magnetometers. A 3-axes accelerometer measures the acceleration along the X, Y, and Z axes, a 3-axes gyroscope measures the angular rate around the X, Y, and Z axes, and a 3-axes magnetometer measures the strength of a magnetic field along the X, Y, and Z axes. The IMU aids in calculating roll (X-axis), pitch (Y-axis), and yaw (Z-axis) angles associated with a movement of an object.

When a user 20 moves with an IMU 21 attached to or held by a part of the body, such as a foot, a waist, a head, and the like, as shown in FIG. 2, the IMU 21 calculates and estimates the movement distance and direction of an object (a user) from inertial data, such as acceleration and angular rate, which are generated according to movement of the object. Physical characteristics accompanied by the way the IMU operates leads to errors in the movement distance and direction being accumulated over elapsed time.

Figure 3:
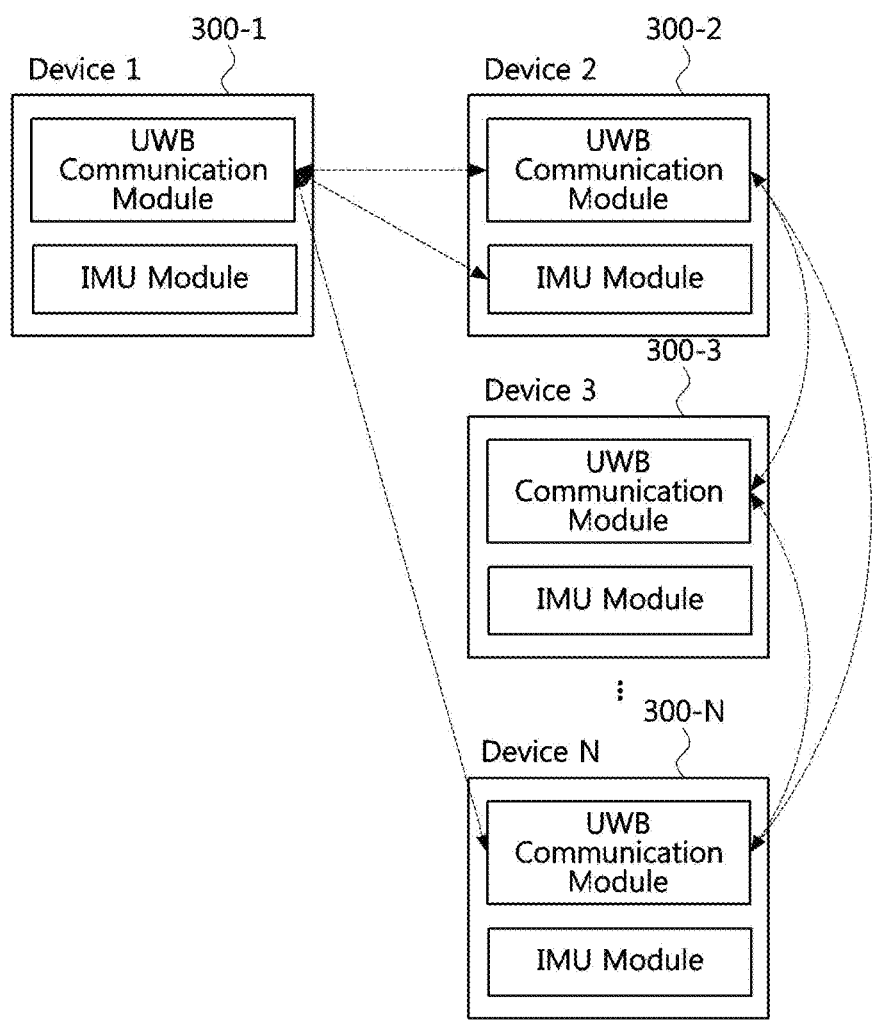
FIG. 3 is a schematic block diagram illustrating an apparatus for correcting an error of relative coordinates of an object according to an embodiment of the present invention.

FIG. 3 is a schematic block diagram illustrating an apparatus for correcting an error of relative coordinates of an object according to an embodiment of the present invention.

Referring to FIG. 3, an apparatus 300-1 for correcting errors of relative coordinates of an object according to the embodiment of the present invention may perform peer-to-peer communication with other apparatuses 300-2, 300-3, . . . , and 300-N for correcting errors of coordinates. The apparatus for correcting errors of relative coordinates may include an ultra-wide band (UWB) communication module for calculating a range between objects and an IMU module for measuring a movement path of the object.

The UWB communication module may calculate a range between objects through inter-object transmission and reception.

The apparatus for correcting errors of relative coordinates according to the embodiment of the present invention may be provided in the form of a device and an apparatus or in the form included in a device, as long as it can be held and carried by a user. In other words, the apparatus for correcting errors of relative coordinates according to the present invention may be installed or included in a mobile station (MS), a user equipment (UE), a user terminal (UT), a wireless terminal, an access terminal (AT), a terminal, a subscriber unit (SU), a subscriber station (SS) and a mobile terminal, a station, a subscriber station, a mobile station, and a portable subscriber station, a node, a device, and may also be installed or included in a wireless communication device such as an Internet of Things (IoT), a mounted module/device/terminal or on-board device/terminal.

Figure 4:
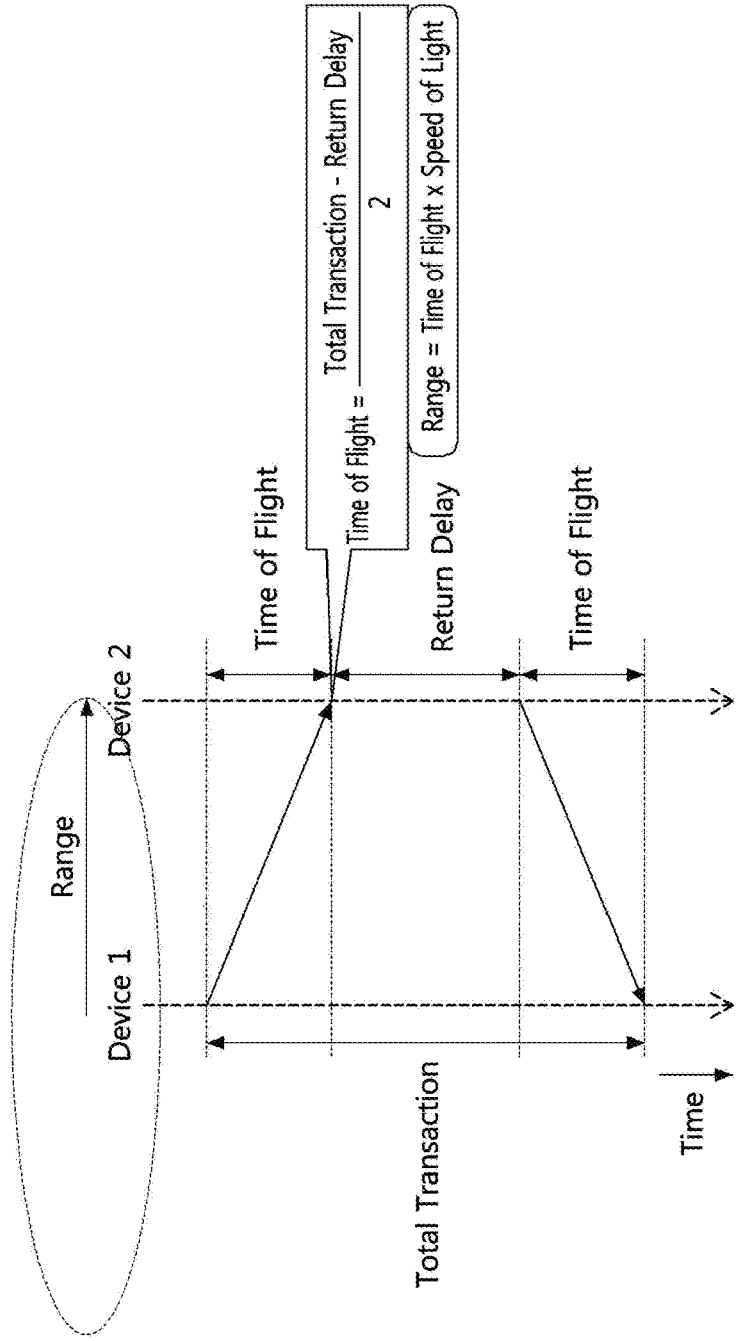
FIG. 4 is a diagram illustrating a method of calculating a range between objects through ultra-wide band (UWB) communication according to an embodiment of the present invention.

FIG. 4 is a diagram illustrating a method of calculating a range between objects through UWB communication according to an embodiment of the present invention.

Referring to FIG. 4, a range calculation through UWB communication between objects according to the embodiment of the present invention is performed by calculating a time of flight of a signal excluding a return delay in a total transaction between two objects and multiplying the calculated time of flight by the speed of light (or radio waves).

The range between the two objects may be expressed as Equation 1 below.

$$\text{Range} = \text{Time of Flight} \times \text{Speed of Light} \qquad \text{[Equation 1]}$$

The total transaction between two objects is measured by each device, and a return delay is also a known value to the devices. Accordingly, each device may calculate a time of flight defined by Equation 2, and the range between two objects is calculated by substituting the time of flight for Equation 1.

$$\text{Time of Flight} = (\text{Total Transaction} - \text{Return Delay})/2 \qquad \text{[Equation 2]}$$

FIG. 5 is a conceptual diagram illustrating an example in which ranges between objects measured through UWB communication are converted into a matrix and a relative-coordinate solution is obtained on the basis of the matrix.

Referring to FIG. 5, object-specific ranges are obtained through UWB communication between n objects to form an n×n matrix according to the embodiment of the present invention. A mathematical equation of the matrix is calculated to obtain a solution for relative coordinates. In this case, due to the nature of the mathematical equation, dual solutions may be produced. For example, referring to FIG. 5, when Device 2 is positioned at actual position A and a solution is obtained simply by using a mathematical equation, position A' at a side opposite the actual position also may be deduced as a solution. In other words, when the distribution of objects is calculated using UWB communication between devices, not only the actual position but also a fake position may be generated.

The present invention is provided to address the above limitation by using the PDR technique using an IMU.

Figure 6:
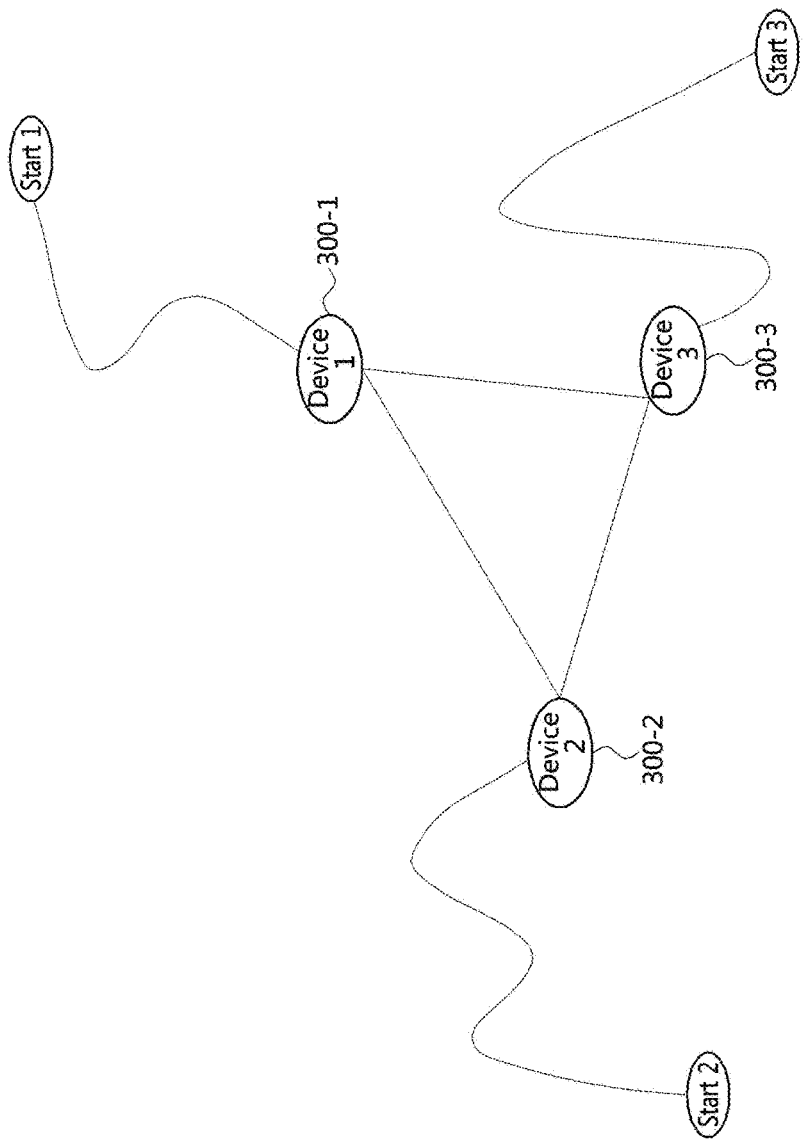
FIG. 6 is a conceptual diagram illustrating a movement path of each object according to a PDR method using an inertial measurement unit (IMU)

FIG. 6 is a conceptual diagram illustrating a movement path of each object according to a PDR method using an IMU.

Under the assumption that three devices or objects 300-1, 300-2, and 300-3 are positioned as shown in FIG. 6, pieces of current coordinate information for respective objects calculated according to the PDR using an IMU are different from each other because the respective objects have different starting origins start 1, start 2, and start 3.

Figure 7:
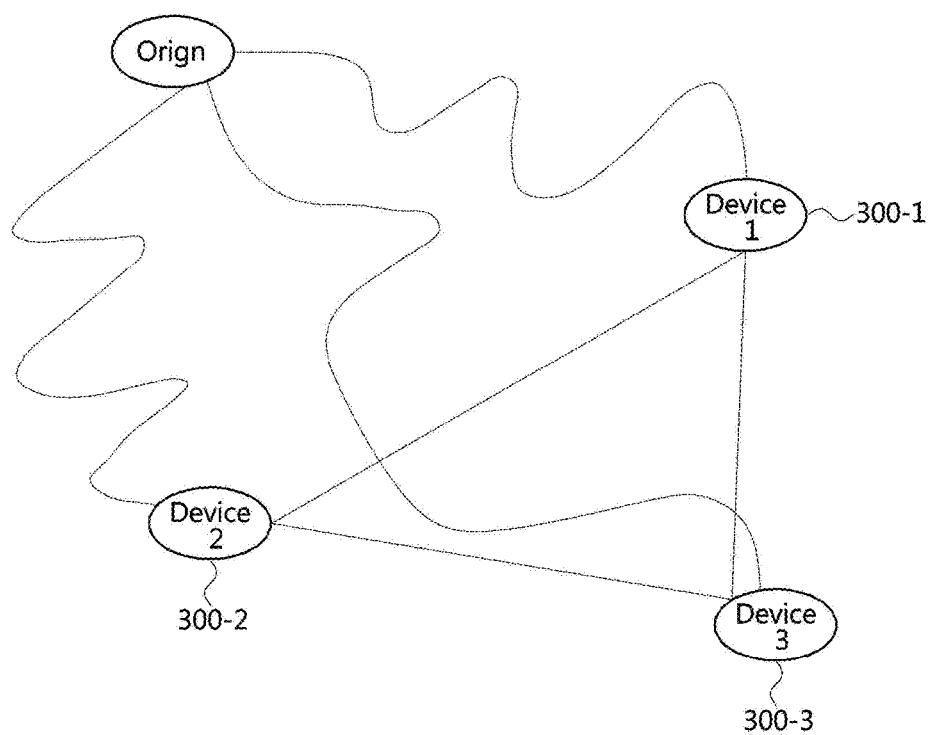
FIG. 7 is a conceptual diagram illustrating a movement path of each device according to a PDR method using an IMU in which starting origins for respective devices coincide with each other.

FIG. 7 is a conceptual diagram illustrating a movement path of each device according to a PDR method using an IMU in which starting origins for respective devices coincide with each other.

FIG. 7 shows movement paths of respective objects according to a PDR with the starting origins of all devices set to be the same in order to position pieces of coordinate information, which are different between objects under the assumption as in FIG. 6, on the same coordinate system.

According to the embodiment of the present invention, the starting origins of all devices match each other so as to make comparisons between coordinate information of each object.

Figure 8:
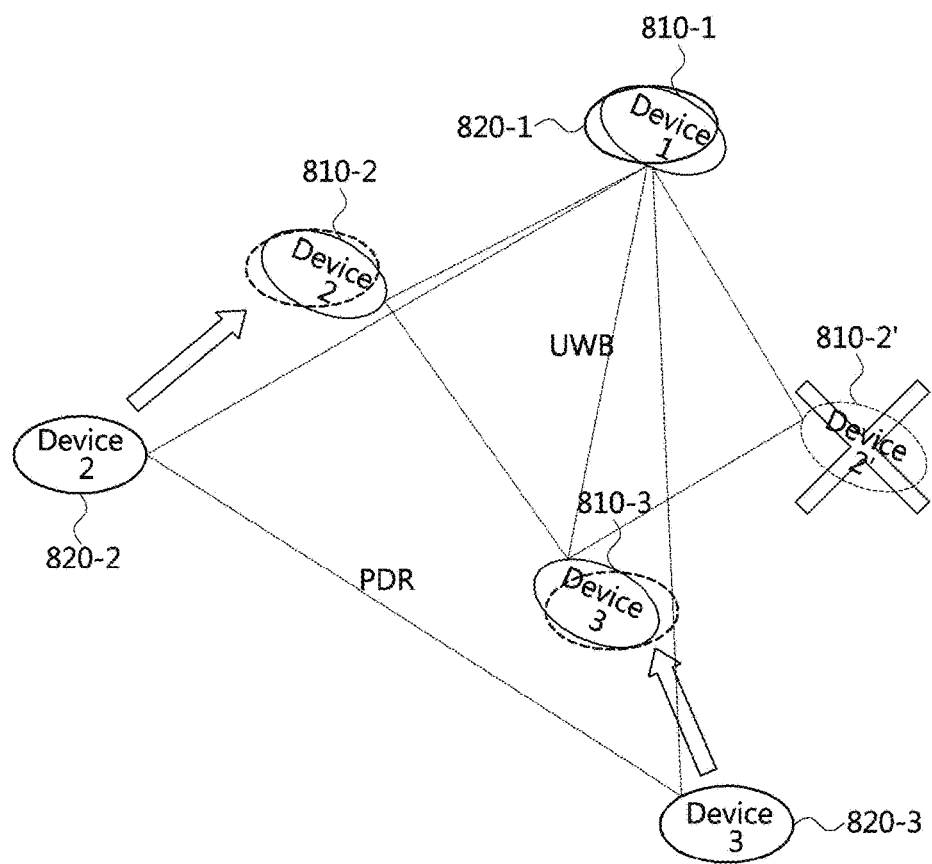
FIG. 8 is a conceptual diagram showing a method of correcting relative coordinate errors for an object according to an embodiment of the present invention.

FIG. 8 is a conceptual diagram showing a method of correcting an error of relative coordinates of an object according to an embodiment of the present invention.

Referring to FIG. 8, each device 300-1 and 300-2, that is, each object measures an inter-object range, and exchanges the measured inter-object range between each other. The objects determine relative positions 810-1, 810-2, and 810-3 of nearby objects with respect to an object, which serves as a center for measurement. FIG. 8 illustrates the position 810-1 of Device 1, the positions 810-2 and 810-2' of Device 2, and the position 810-3 of device 3 determined through the UWB communication, wherein the determined relative position coordinates may include a fake (or an image) solution 810-2'. In addition, each object measures a movement path thereof with respect to the same starting origin through the PDR method and converts the measured movement path into coordinates. Each object transmits the information thereof in the form of coordinates to another object such that the coordinate information is shared between the objects.

In FIG. 8, the positions 820-1, 820-2, and 820-3 of the devices, which are measured through the PDR and converted into coordinates, appear. The embodiment of FIG. 8 shows relative coordinates with respect to Device 1, and as for Device 2 and Device 3, it can be seen that there are errors in the respective coordinates calculated through the UWB communication and the coordinates of each device measured through the PDR method.

A fake (or an image) coordinate 810-2' of the relative position coordinate information calculated through the UWB communication may be removed through the movement path coordinates generated using the PDR. In addition, the movement path coordinates 820-2 and 820-3 generated using the PDR may be corrected through the relative coordinate information 810-2 and 810-3 calculated through the UWB communication.

As the coordinate information determined and corrected according to the embodiment shown in FIG. 8 corresponds to a relative position with respect to an object serving as a center for measurement (Device 1 in FIG. 8), coordinates are determined and corrected with respect to the object serving as the center for measurement. That is, the distribution of counterpart objects with respect to an object that performs measurement is confirmed. Meanwhile, in order for each object to obtain range information from counterpart objects and generate a matrix having ranges as elements, various methods may be used.

Figure 9:
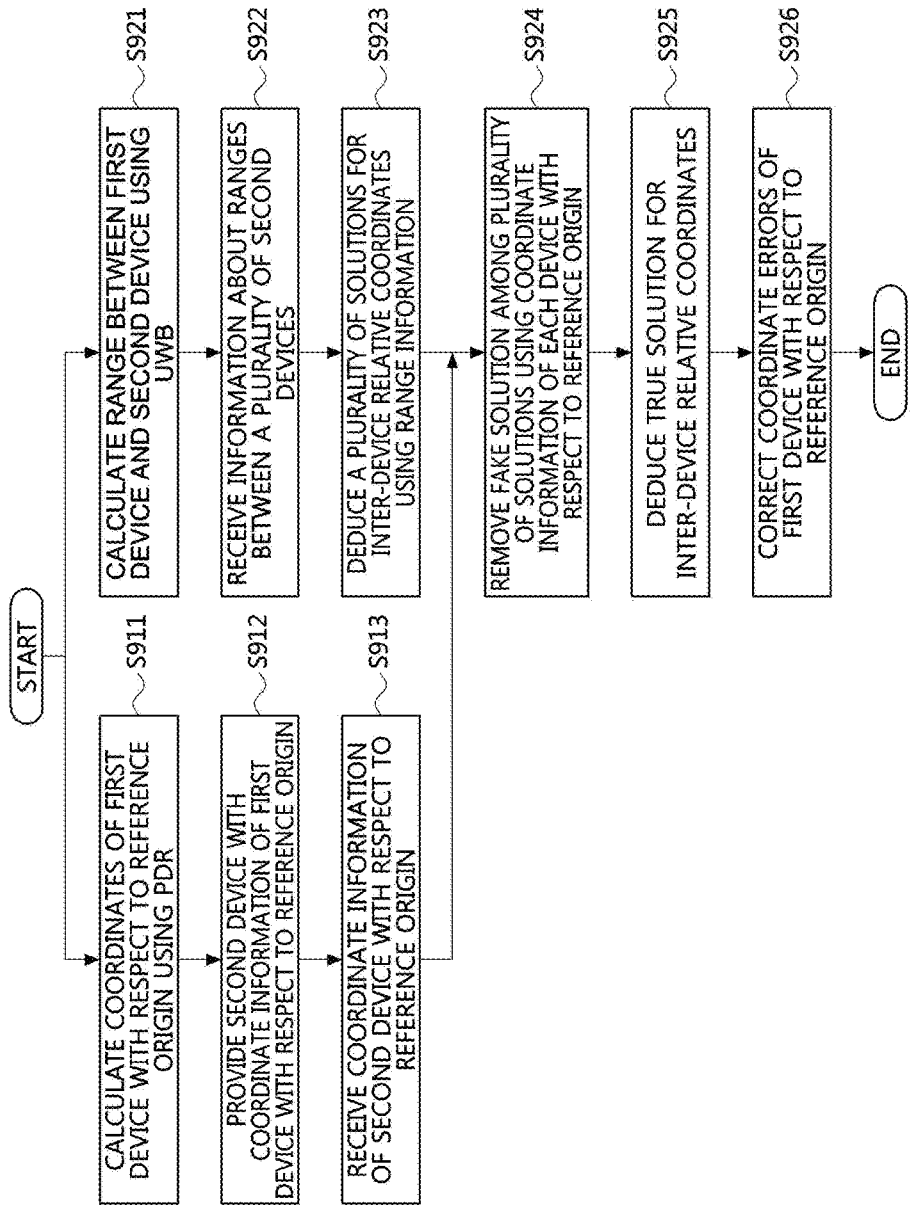
FIG. 9 is an operation flowchart showing a method of measuring relative coordinates according to an embodiment of the present invention.

FIG. 9 is an operation flowchart showing a method of measuring relative coordinates according to an embodiment of the present invention.

As described above, the method of correcting errors in relative coordinates according to the present invention may correct errors of relative coordinates by performing mutual correction on a PDR coordinate system based on the IMU module and a relative coordinate system based on the UWB communication.

The method of measuring relative coordinates according to the present invention may be performed by each of a plurality of devices belonging to a group deployed on the site.

For example, FIG. 9 illustrates a method of measuring inter-device relative coordinates performed by Device 1 according to the embodiment.

Device 1 calculates coordinates of Device 1 with respect to a reference origin using the PDR (S911). The coordinate information of Device 1 with respect to the reference origin is provided to Device 2 which belongs to a group to which Device 1 belongs (S912). In addition, Device 1 receives coordinate information of Device 2 from Device 2 (S913).

Separately from the procedure of obtaining the PDR coordinate system in operations S911 to S913, Device 1 calculates a range between Device 1 and Device 2 using the UWB (S921). That is, Device 1 receives information about ranges between a plurality of Device 2s (S922). That is, Device 1 collects range information from devices that are not directly involved with Device 1. Device 1, having collected range information of all devices belonging to the same group, deduces a plurality of solutions for inter-device relative coordinates using the collected range information (S923).

Meanwhile, the procedure of obtaining the UWB coordinate system in operations S921 to S923 may be performed separately from the procedure of obtaining the PDR coordinate system in operations S911 to S913. The procedure of obtaining the UWB coordinate system and the procedure of obtaining the PDR coordinate system may be simultaneously or sequentially performed.

After the UWB coordinate system and the PDR coordinate system are obtained, a fake solution is removed from among the plurality of solutions for inter-device relative coordinates using coordinate information of each device with respect to the reference origin (S924). Upon removing the fake solution, a true solution for inter-device relative coordinates is obtained based on relative coordinates (S925). Device 1 corrects errors of the coordinates of Device 1 with respect to the reference origin using the relative coordinates of Device 1 (S926).

Figure 10A:
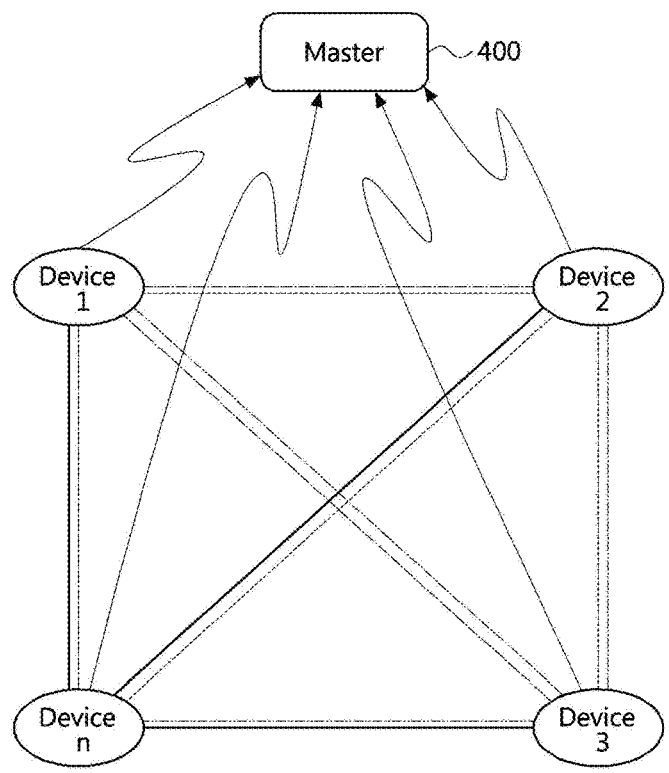
Figure 10B:
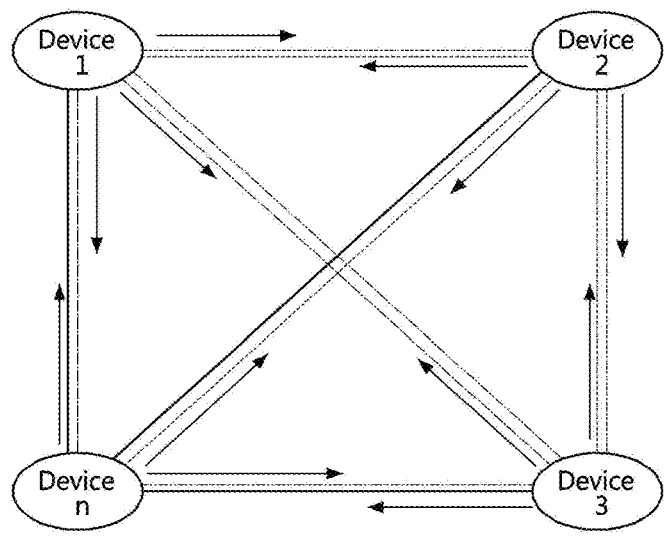

FIGS. 10A and 10B are conceptual diagrams showing a method of sharing inter-device range information according to an embodiment of the present invention, in which FIG. 10A shows a concept of a centrally-controlled type range information sharing method, and FIG. 10B shows a concept of a distributed type range information sharing method.

In the case of the centrally controlled method shown in FIG. 10A, range information to a counterpart object obtained by each object is transmitted to a master 400. The master 400 may complete an inter-object range matrix illustrated with reference to FIG. 5 using the inter-object range information received from each object. The master 400 may be a device separately provided from each device, for example, a device positioned on a mobile control center deployed at a disaster site. The master 400 may be a device selected from a plurality of devices deployed at the site of disaster.

In the case of the distributed method shown in FIG. 10B, each object broadcasts range information of a counterpart object obtained by each object to all objects in its group such that all objects share the range information with each other. In the case of the distributed method, each device may serve as an entity that generates an inter-object range matrix.

Figure 11A:
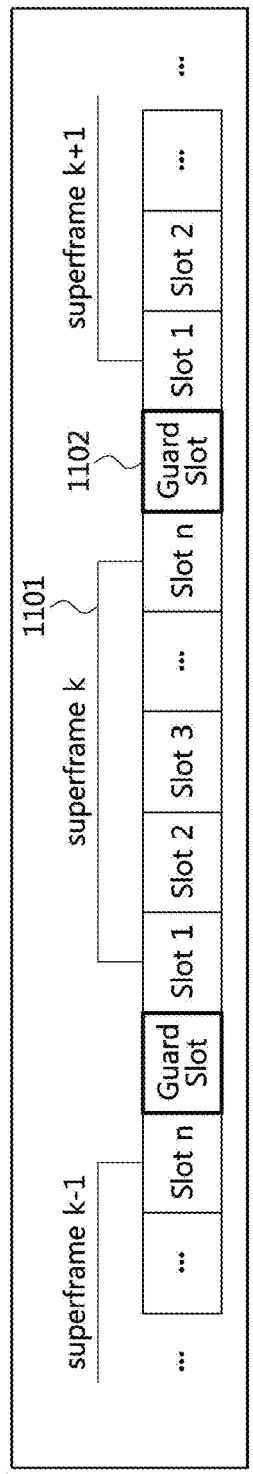
FIG. 11A illustrates a communication frame structure used for range information calculation according to an embodiment of the present invention.

FIG. 11A illustrates a communication frame structure used for range information calculation according to an embodiment of the present invention.

The embodiment illustrated in FIG. 11A represents a frame structure that is used by a certain object to obtain a range from another object and range information from between other objects except for the certain object in order to communicate with the other objects. The object obtains the range information between the other objects, generates a matrix having ranges as elements, and obtains inter-object relative coordinates.

Referring to FIG. 11A, the structure of a frame and a slot used by all objects participating in range measurement is used for mutual range measurement. The total time duration includes a plurality of superframes 1101, and each of the superframes may be composed of a plurality of slots. In addition, a guard slot 1102 is disposed between the superframes 1101.

In a single superframe, a certain object may be assigned one or more slots for the certain object. The object may transmit information about the object to nearby objects through the one or more slots assigned to the object. In addition, the object calculates a range from another certain object on the basis of a signal received from the nearby objects through other slots and stores the calculated range. That is, during a single superframe, each object may transmit its information in a slot assigned thereto, and in a slot other than the slot thereof, may calculate and store a range of another object occupying the slot other than the slot thereof on the basis of a signal sent by the other object. In this case, each object only has the range information of a nearby object that has exchanged a signal with the object. In other words, during a superframe, each object does not obtain range information of other objects with which the object has not directly exchanged a signal in the superframe.

Figure 11B:
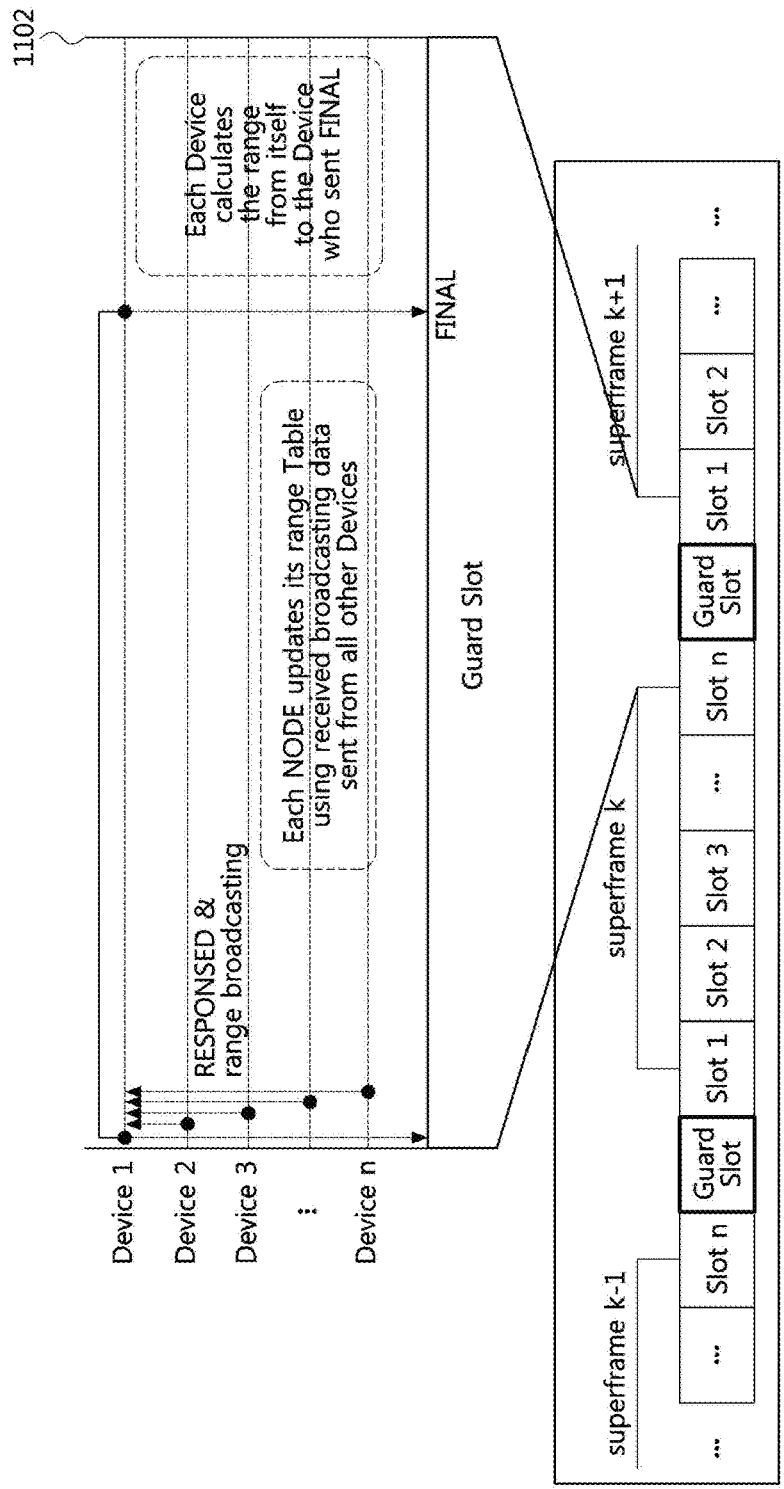
FIG. 11B is a detailed view illustrating a guard slot of a communication frame structure used for range information calculation according to an embodiment of the present invention.

FIG. 11B is a detailed view illustrating a guard slot of a communication frame structure used for range information calculation according to an embodiment of the present invention.

Referring to FIG. 11B, in the guard slot 1102 disposed between the superframes, the objects consecutively broadcast range information possessed by the objects. In this process, all objects included in the superframe each complete the matrix of inter-object ranges as described above with reference to FIG. 5. When the guard slot 1102 ends, a new superframe starts and the above described procedure is repeated.

Figure 12:
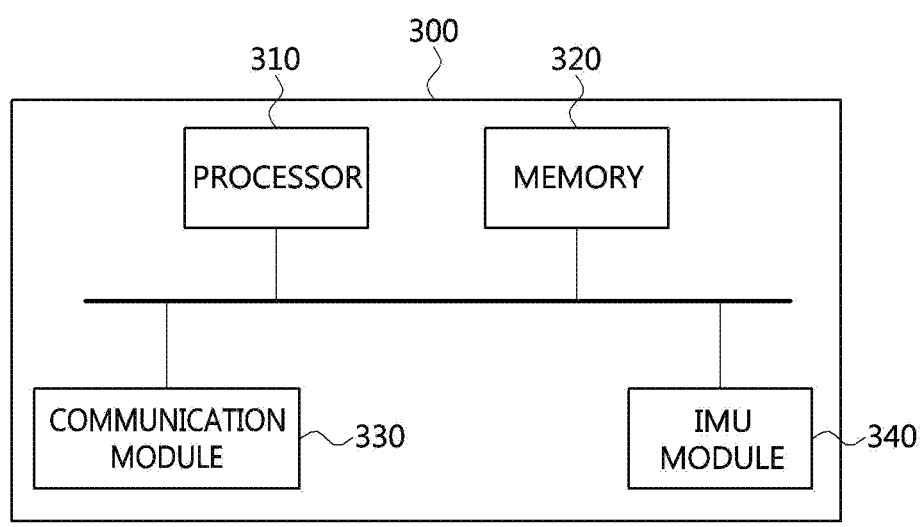
FIG. 12 is a block diagram of a device for calculating a range to another device according to an embodiment of the present invention.

FIG. 12 is a block diagram of a device for calculating a relative range to another device according to an embodiment of the present invention.

A device 300 according to the embodiment of the present invention includes a processor 310, a memory 320, a communication module 330, and an IMU module 340.

The communication module 330 performs communication with another device belonging to a group to which the device 300 belongs. An inter-device communication method may be implemented using a UWB method. The IMU module 340 includes at least one IMU to calculate coordinates of a device according to a PDR technique. The coordinates of a device refer to coordinates with respect to a reference origin, and all devices belonging to the same group calculate coordinates thereof according to the PDR with respect to the same origin.

The memory 320 stores at least one command executed through the processor 310, and the at least one command includes: a command allowing a range between the device and another device to be measured through communication with the other device; a command allowing range information between a plurality of other devices to be received from the other device; a command allowing a plurality of solutions for inter-device relative coordinates to be calculated using range information between the plurality of devices belonging to the same group; and a command allowing a true solution among the plurality of solutions for the inter-device relative coordinates to be deduced using coordinates of each device that are calculated using a Pedestrian Dead Reckoning (PDR) technique with respect to a reference origin.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the example embodiments of the present invention and their advantages have been described in detail, it should be understood that various changes, substitutions and alterations may be made herein without departing from the scope of the invention.

What is claimed is:

1. A method of measuring inter-device relative coordinates performed by a first device communicating with at least one second device belonging to a group to which the first device belongs, the method comprising:
- measuring a range between the first device and the at least one second device through communication with the at least one second device;
- receiving, from the at least one second device, range information between a plurality of second devices;
- calculating a plurality of solutions for the inter-device relative coordinates using information about the range between the first device and the at least one second device and the range information between the plurality of second devices; and
- deducing a true solution among the plurality of solutions using coordinates of each of the first device and the at least one second device with respect to a reference origin that are calculated using a Pedestrian Dead Reckoning (PDR) technique.

2. The method of claim 1, wherein the first device and the at least one second device communicate with each other using an ultra-wide band (UWB) method.

3. The method of claim 1, further comprising calculating coordinates of the first device with respect to the reference origin using an inertial measurement unit (IMU) included in the first device.

4. The method of claim 1, further comprising correcting an error of the coordinates of the first device with respect to the reference origin by using the true solution.

5. The method of claim 1, wherein the range between the first device and the at least one second device is calculated using a total transaction between the first device and the at least one second device, a speed of light or radio waves, a return delay of a device, and a time of flight of a signal.

6. The method of claim 1, further comprising:
- calculating coordinates of the first device with respect to the reference origin using the PDR technique; and
- transmitting information about the coordinates of the first device to the at least one second device.

7. The method of claim 1, further comprising receiving information about the coordinates of the at least one second device with respect to the reference origin from the at least one second device.

8. The method of claim 1, wherein the first device and the at least one second device transmit and receive data therebetween using a frame structure including superframes and a guard slot positioned between the superframes.

9. The method of claim 8, wherein the first device transmits information about the first device using a slot allocated to the first device among a plurality of slots included in the superframe.

10. The method of claim 8, wherein each of a plurality of devices belonging to the same group transmits information about inter-device range information to another device using the guard slot.

11. A device for measuring relative coordinates between a plurality of devices belonging to the same group, the device comprising:
- a communication module performing communication with a plurality of other devices belonging to the same group;
- an IMU module configured to calculate coordinates of the device with respect to a reference origin according to a Pedestrian Dead Reckoning (PDR) technique;
- a processor; and
- a memory that stores at least one command executed through the processor,
wherein the at least one command includes:
- a command allowing a range between the device and another device to be measured through communication with the other device;
- a command allowing range information between the plurality of other devices to be received from the other device;
- a command allowing a plurality of solutions for inter-device relative coordinates to be calculated using range information between the plurality of devices belonging to the same group; and
- a command allowing a true solution among the plurality of solutions for the inter-device relative coordinates to be deduced using coordinates of each of the devices with respect to the reference origin that are calculated using the PDR technique.

12. The device of claim 11, wherein the communication module and the other device communicate with each other using an ultra-wide band (UWB) method.

13. The device of claim 11, wherein the reference origin equally applies to all devices belonging to the same group.

14. The device of claim 11, wherein the at least one command further includes a command allowing an error of the coordinates of the device with respect to the reference origin to be corrected using the true solution.

15. The device of claim 11, wherein the range information between the plurality of devices belonging to the same group is calculated using a total transaction between devices, a speed of light or radio waves, a return time of a device, and a time of flight of a signal.

16. The device of claim 11, wherein the at least one command includes:
- a command allowing coordinates of the device with respect to the reference origin to be calculated using the PDR; and
- a command allowing information about the coordinates of the device to be transmitted to the other device.

17. The device of claim 11, wherein the at least one command further includes a command allowing information about the coordinates of the other device with respect to the reference origin to be received from the other device.

18. The device of claim 11, wherein the device and the other device transmit and receive data therebetween using a frame structure including a plurality of superframes and a guard slot positioned between the superframes.

19. The device of claim 18, wherein the device transmits information about the device to the other device by using a slot, which is allocated to the device, among a plurality slots included in the superframe.

20. The device of claim 18, wherein the device broadcasts range information between the device and the other device through the guard slot.

* * * * *